H. W. ALDEN.
VEHICLE WHEEL.
APPLICATION FILED JAN. 10, 1913.
1,078,760.
Patented Nov. 18, 1913.
2 SHEETS—SHEET 1.
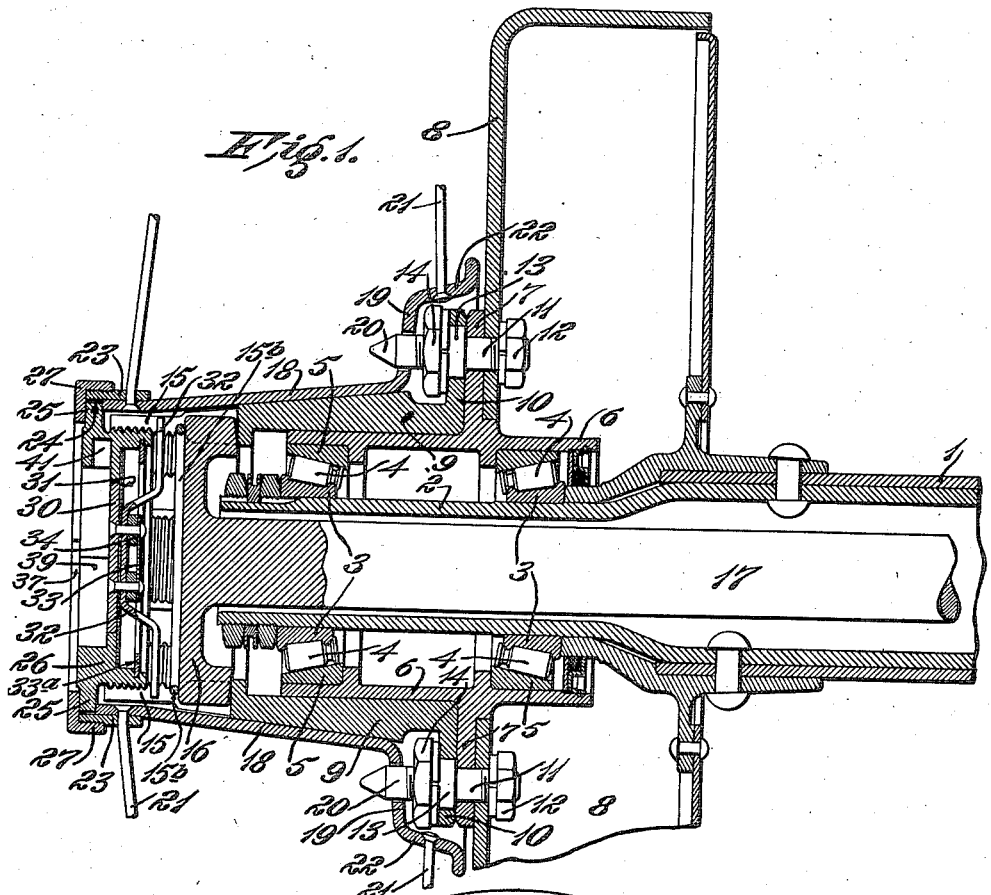
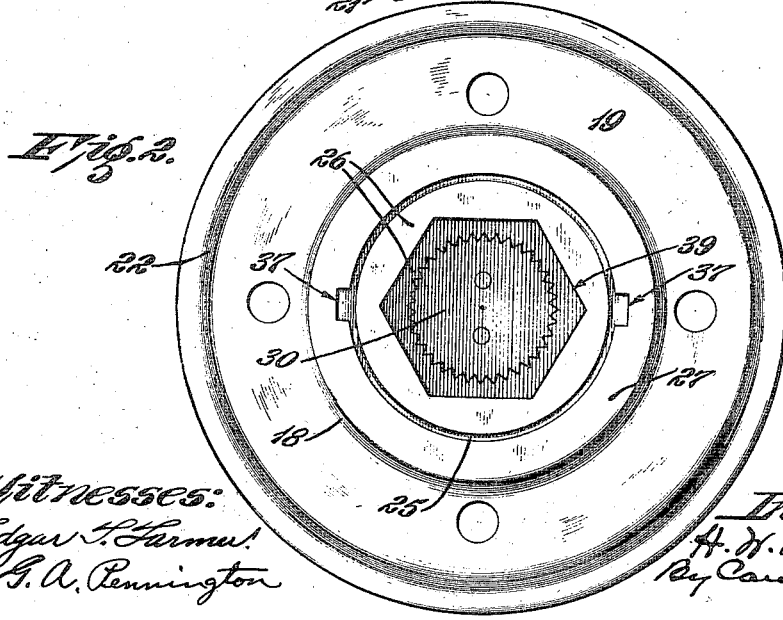
Witnesses:
Edgar T. Farmer
G. A. Pennington
Inventor:
H. W. Alden,
By Cant & Carter
his Attys H. W. ALDEN.
VEHICLE WHEEL.
APPLICATION FILED JAN. 10, 1913.
1,078,760.
Patented Nov. 18, 1913.
2 SHEETS—SHEET 2.
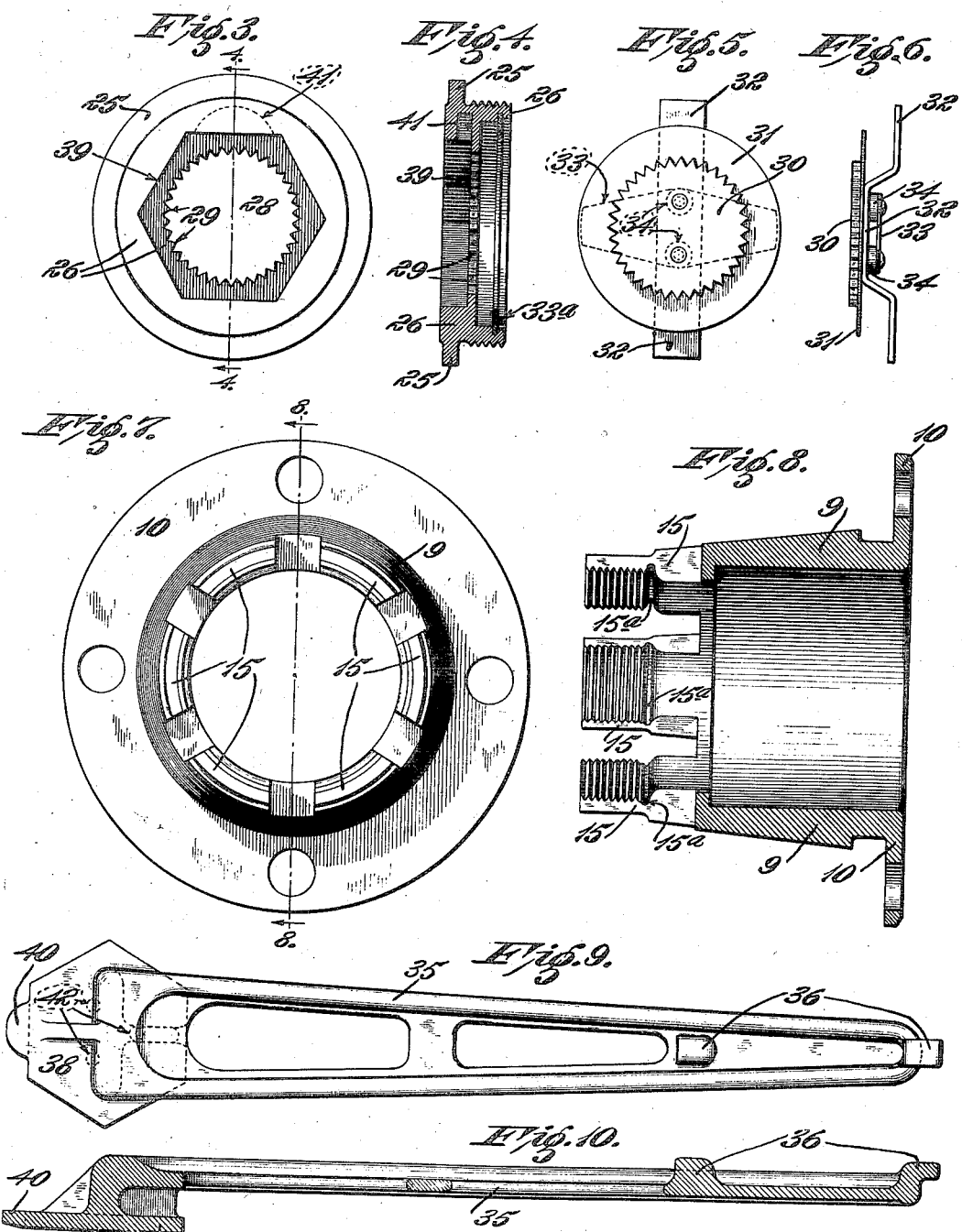

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

VEHICLE-WHEEL.

1,078,760. Specification of Letters Patent. Patented Nov. 18, 1913.

Application filed January 10, 1913. Serial No. 741,244.

*To all whom it may concern:*

Be it known that I, HERBERT W. ALDEN, a citizen of the United States, and a resident of the city of Detroit, in the county of Wayne and State of Michigan, have invented a certain new and useful Improvement in Vehicle-Wheels, of which the following is a specification.

This invention relates to vehicle wheels and more particularly to wheels having demountable hubs.

It has for its principal objects to provide for readily attaching and detaching the demountable hub member; to provide an internal securing device which will not work loose; to improve generally upon wheel hubs of this type; and to attain certain advantages which will hereinafter more fully appear.

The invention consists in the parts and in the arrangements and combinations of the parts hereinafter described and claimed.

In the accompanying drawings, which form part of this specification, and wherein like symbols refer to like parts wherever they occur, Figure 1 is a longitudinal section through the end portion of a driving axle with the hub of a wire wheel thereon, illustrating an embodiment of the invention; Fig. 2 is an end view of the demountable hub barrel, the spokes being omitted; Fig. 3 is an outer face view of the hub securing cap; Fig. 4 is a section on the line 4—4 of Fig. 3; Fig. 5 is an outer face view of the locking member for the hub securing cap; Fig. 6 is an edge view of said locking member; Fig. 7 is an end view of the permanent hub member; Fig. 8 is a section on the line 8—8 of Fig. 7; Fig. 9 is a plan view of a wrench adapted for manipulating the hub securing elements; and Fig. 10 is a longitudinal section of the wrench.

In the drawings a hollow driving axle 1 is shown. On the reduced spindle portion 2 of the axle are sleeved the inner bearing rings 3 for the hub bearings 4. The outer bearing rings 5 are mounted in a hub box or bushing 6 which latter has an annular external flange 7 to which the brake drum 8 is attached.

Sleeved on the bushing 6 is a permanent hub member 9 which is tapered on the outside and has a flange 10 at its inner end arranged and adapted to be detachably secured to the flange 7 of the bushing 6. As shown in the drawing, a shouldered stud 11 is inserted through registered perforations in the flange 7 and brake drum 8 and said stud is provided with a nut 12 for clamping the parts together. The flange 10 of the hub member 9 is provided with perforations adapted to receive the collars on shoulder portions 13 of the studs 11 and said flange is secured in place by nuts 14 on the studs. The permanent hub member 9 is further provided with a series of segmental fingers 15, preferably six of them, which project from its outer end and are adapted to be engaged by counterpart peripheral portions of a clutch collar or head 16 on the end of the driving shaft 17. The fingers 15 are grooved, as at $15^a$, to receive a spring ring $15^b$ which holds the driving shaft 17 in place.

A tapered outer barrel or shell 18 is slipped over the permanent hub member 9 and has its inner end portion flanged outward, as at 19, and perforated to receive the projecting outer end portions 20 of the studs 11. By this arrangement the barrel 18 may be held from rotating independently of the permanent hub member 9.

As shown, the barrel 18 is adapted for a wheel having wire spokes 21, the outer spokes being secured to the outer end portion of the barrel and the inner spokes to the flange 22 which forms, with the flange 19, a bell at the inner end of the barrel. Obviously, however, the barrel may be arranged and adapted to receive wooden spokes of wheels of the ordinary or "artillery" type.

On the outer end portion of the barrel 18 is brazed, welded or otherwise permanently fastened a ring 23. This ring extends beyond the end of the barrel so as to provide an annular rabbet or recess 24 adapted to receive the annular flange 25 of a securing cap or nut 26, which latter is held in place by a flanged ring 27 screwed onto the fixed ring 23.

The cap 26 is screwed into the permanent hub member 9, the threads on the latter being on the inner side of the segmental fingers 15 which extend out beyond where said clutch collar 16 on the end of the driving shaft 17 engages them. Hence, since the flange 25 of the cap 26 lies between the end of the barrel 18 and the ring 27, the barrel will be either forced on or pulled off the permanent hub member 9, according to the direction in which the cap is rotated.

In order to prevent the securing cap from coming loose and working out while in service, it is provided with a central hole 28 around the edge of which are a multiplicity of notches or serrations 29. In this hole is fitted loosely a toothed or serrated circular locking plate 30. On the back of this plate 30 is secured a thin circular plate 31 of a diameter slightly less than the interior of the cap. This plate 31 centers the locking plate 30 with respect to the hole 28 and prevents the plate 30 from moving too far out. Back of the plate 31 is fixed a bar 32 whose end portions are offset and extend between two diametrically opposite spaces between the fingers 15 of the permanent hub member 9, so that the plate 30 is held from rotating independently of said permanent hub member 9 but is movable longitudinally thereto. Consequently, when the plate 30 is in the hole 28 the cap member 26 cannot be rotated in the hub member 9, and, therefore, it cannot work loose.

The locking plate 30 is yieldingly held normally in engagement with the hub securing cap 26 by a leaf spring 33 which is secured to the locking plate. Said spring is spaced from the locking plate by washers or blocks 34 which are interposed between the spring and the bar 32. The ends of the spring 33 engage behind a washer or ring 33ª which is fitted in an annular internal groove near the inner end of the cap member 26. By this arrangement the spring acts constantly to move the locking plate outward, and the cap is permitted to rotate when the locking plate is pressed inward free thereof.

In Figs. 9 and 10 a special wrench 35 for turning the ring 27 and the securing cap 26 is illustrated. Near one end the wrench is provided with two alined lugs 36 adapted to engage diametrically opposite notches 37 in the ring 27. The wrench is provided at its opposite end with a hexagonal head 38 adapted to fit in a counterpart recess or seat 39 in the cap 26. One side of the head 38 is provided with a lip 40 adapted to fit in a socket 41 provided in the cap 26 at one side of the seat 39; and the head 38 is further provided with a plurality of feet 42, preferably three of them, which are adapted to press against the locking plate 30. Consequently, when the head 38 is moved into the seat 39, the locking plate 30 is moved out of engagement with the cap so as to permit the latter to be rotated.

While the hub is shown in the drawings as applied to a driving wheel, obviously the same construction and arrangement is applicable to a front or free wheel. And it is further obvious that the construction and arrangement of the device admits of considerable modification without departing from the invention. Therefore, I do not wish to be limited to the exact construction and arrangement shown.

What I claim is:

1. In a vehicle wheel, a permanent hub member, a demountable hub member on said permanent hub member, a securing nut screwed on said permanent hub member and engaging said demountable hub member so as to retain the latter in place, and a locking device carried by said securing nut and movable longitudinally thereof, said nut and locking device being relatively arranged and adapted for releasable interlocking engagement, said locking device having a longitudinal slidable engagement with said permanent hub member.

2. In a vehicle wheel, a permanent hub member, a demountable hub member on said permanent hub member, a securing nut screwed on said permanent hub member and engaging said demountable hub member so as to retain the latter in place, a locking device carried by said securing nut and movable longitudinally thereof, said nut and locking device being relatively arranged and adapted for releasable interlocking engagement, said locking device having a longitudinal slidable engagement with said permanent hub member, and resilient means for holding said locking device normally in interlocking engagement with said nut.

3. In a vehicle wheel, a permanent inner hub member, a demountable outer hub member sleeved over said permanent hub member, releasable clutch means for holding said members from rotating independently of each other, a securing nut swiveled on said demountable hub member and screwed on said permanent hub member, and a locking device carried by said nut and movable longitudinally thereof, said nut and locking device being relatively arranged and adapted for interlocking engagement, said locking device having a longitudinal slidable engagement with said permanent hub member.

4. In a vehicle wheel, a permanent inner hub member, a demountable outer hub member sleeved over said permanent hub member, a securing nut screwed on said permanent hub member and engaging said demountable hub member so as to retain the latter in place, said securing nut having a central opening therein and annularly arranged clutch portions in the region of said opening, a locking element carried by said nut in the region of said opening and having clutch portions adapted to engage the clutch portions of the nut, said locking element being movable longitudinally of said nut and having a longitudinal slidable engagement with said permanent hub member, and resilient means for holding said locking element normally in interlocking engagement with said nut.

5. In a vehicle wheel, a permanent inner hub member, a demountable outer hub member sleeved over said permanent hub member, a securing nut screwed on said permanent hub member and engaging said demountable hub member so as to retain the latter in place, said nut having a central circular opening, a circular locking plate fitted detachably in said opening, the contiguous edges of said nut and locking plate being relatively arranged for interlocking engagement so that said nut and plate are held from rotation independently of each other, means for movably supporting said locking plate on said nut, a spring coöperating with said nut and locking plate for holding the latter in interlocked engagement with the former, and means on said locking plate for effecting a longitudinally slidable engagement with said permanent hub member.

6. In a vehicle wheel, a permanent inner hub member, a demountable outer hub member sleeved over said permanent hub member, a releasable clutch means for holding said hub members from rotating independently of each other, said demountable hub member having a securing nut swiveled within its outer end portion and the outer end portion of said permanent hub member being screw-threaded internally to receive said securing nut, and a locking device carried by said nut and movable longitudinally thereof, said nut and locking device being adapted for releasable interlocking engagement, and said locking device having a slidable engagement with said permanent hub member longitudinally thereof.

7. In a vehicle wheel, the combination with a permanent inner hub member, of a demountable outer hub member sleeved over said permanent hub member, a securing nut screwed in the outer end of said permanent hub member and engaging said demountable hub member so as to retain the latter in place, said securing nut having a hole centrally therethrough and means for the attachment of a wrench in the region of said hole, a locking plate mounted in said securing nut in the region of the central hole therein and movable longitudinally thereof, said nut and plate having means for effecting a releasable interlocking engagement between them, resilient means for holding said locking plate normally in interlocked engagement with said nut, and means for effecting a longitudinal slidable engagement of said locking plate with said permanent hub member.

8. In a vehicle wheel, the combination with a permanent inner hub member, of a demountable outer hub member sleeved over said permanent hub member, said demountable hub member having a securing nut swiveled within its outer end portion and the outer end portion of said permanent hub member being screw-threaded internally to receive said securing nut, said securing nut having a cylindrical recess in its inner end, wrench receiving means on its outer end, a central hole therein, and clutch means in the region of said central hole, a circular locking device rotatable and movable longitudinally in the cylindrical recess in said securing nut, said locking device having clutch means adapted for engagement with the clutch means on said securing nut, resilient means for holding said locking device normally in interlocked engagement with said securing nut, and means for effecting a longitudinal slidable engagement of said locking device with said permanent hub member.

Signed at Detroit, Michigan, this 6th day of January, 1913.

HERBERT W. ALDEN.

Witnesses:
LESLIE WILLIAMS,
E. M. SWEITZER.